United States Patent [19]

Glemet et al.

[11] Patent Number: 4,937,028
[45] Date of Patent: Jun. 26, 1990

[54] PROCESS FOR PRODUCING THERMOPLASTIC RESINS REINFORCED WITH LONG FIBERS

[75] Inventors: Michel Glemet, Serquigny; Bernard Gourdon, Dardez-Evreux; Michel Lottiau, Bernay, all of France

[73] Assignee: Societe Atochem, Puteaux, France

[21] Appl. No.: 341,568

[22] Filed: Apr. 21, 1989

[30] Foreign Application Priority Data

May 9, 1988 [FR] France ................. 88 06220

[51] Int. Cl.$^5$ .................. B05D 1/38; B05D 3/12; B29C 47/02
[52] U.S. Cl. ................... 264/136; 264/174; 264/211.24; 427/407.3; 427/412.1; 427/434.6
[58] Field of Search ............. 264/136, 174, 211.24; 427/258, 407.2, 407.3, 412.1, 434.6, 434.7

[56] References Cited

U.S. PATENT DOCUMENTS

| | | | |
|---|---|---|---|
| 3,471,322 | 10/1969 | Medney | 427/434.6 X |
| 3,608,001 | 9/1971 | Kowalski et al. | 264/211.24 X |
| 3,834,980 | 9/1974 | Hall | 428/220 |
| 3,993,726 | 11/1976 | Moyer | 264/174 |
| 4,218,202 | 8/1980 | Seguin | 264/174 X |
| 4,312,917 | 1/1982 | Hawley | 264/174 X |
| 4,380,523 | 4/1983 | Lind et al. | 264/136 X |
| 4,588,538 | 5/1986 | Chung et al. | 264/136 X |
| 4,614,678 | 9/1986 | Ganga | 264/136 X |
| 4,675,210 | 6/1987 | Clayton et al. | 427/407.2 X |
| 4,743,413 | 5/1988 | Galichon | 264/136 X |
| 4,783,349 | 11/1988 | Cogswell et al. | 427/407.3 |
| 4,792,481 | 12/1988 | O'Connor et al. | 427/434.7 X |

FOREIGN PATENT DOCUMENTS

| | | | |
|---|---|---|---|
| 2162329 | 7/1972 | Fed. Rep. of Germany | 264/211.24 |
| 58-205755 | 11/1983 | Japan | 264/136 |
| 1229063 | 5/1986 | U.S.S.R. | 264/136 |
| 1094439 | 12/1967 | United Kingdom | . |

Primary Examiner—Jeffery Thurlow
Assistant Examiner—Leo B. Tentoni
Attorney, Agent, or Firm—Burgess, Ryan & Wayne

[57] ABSTRACT

A process is provided for producing thermoplastic resins reinforced with long fibers in which rovings are impregnated with a wetting thermoplastic polymer by means of a die and a baffle zone, then taking up the impregnated rovings in a second die where they are then covered with a thermoplastic polymer.

9 Claims, 1 Drawing Sheet

PROCESS FOR PRODUCING THERMOPLASTIC RESINS REINFORCED WITH LONG FIBERS

BACKGROUND OF THE INVENTION

1. FIELD OF THE INVENTION

This invention relates to a process for producing thermoplastic resins reinforced with long fibers.

In one aspect this invention is directed to a process for reinforcing resins with fibers.

In another respect, this invention relates to a process wherein fibers are first impregnated with a wetting thermoplastic polymer and then coated with another thermoplastic polymer for reinforcing.

2. DESCRIPTION OF RELATED ART

It is known in the art to reinforce thermoplastic resins with long fibers. The most classical means is to coat the strands of fiber or rovings with thermoplastic resin by extrusion. However, difficulties have been encountered which have been described and partially solved in British Pat. No. 1,094,439. These difficulties result from the poor adherence to the fibers of certain thermoplastic resins such as the polyolefins. This problem has been overcome by impregnating the fibers, before being coated with the selected thermoplastic resin, with a wetting thermoplastic polymer such as a polyolefin modified by grafting with an ethylenically unsaturated polycarboxylic acid. However, the known methods of impregnation are not quite satisfactory, the most realistic consisting in continuosly passing the fibers into a solution of wetting polymer prior to the final coating. Besides the problem of traces of solvent remaining in the material, the process is not practical and is burdensome, since it requires the handling of solvent.

In U.S. Pat. No. 3,993,726, there has been described a process for the continuous production of articles of thermoplastic resin reinforced with long fibers of glass. According to the method described, the roving is impregnated with a mixture of wetting thermoplastic resin and reinforcing thermoplastic resin in a crosshead die fed by an extruder.

The fibers are impregnated by first expanding the fibers of the roving and coating the expanded fibers in a crosshead die and passing the fibers and the thermoplastic mixture through a bar zone so that the material thoroughly penetrates into each fiber. This system is also not completely satisfactory, since the wetting polymer diluted in the other polymer loses most of its effectiveness.

SUMMARY OF THE INVENTION

According to the process of the invention, it is possible to reinforce thermoplastic resins with fibers using a minimum of wetting resin by virtue of a simple method of maximum distribution of said wetting resin through the fibers of the rovings. The process comprises passing the rovings, in a first stage, after having carefully expanded the fibers through a cross head die fed with wetting thermoplastic resin. After impregnation of the fibers with the wetting resin, the rovings pass to a second stage, through a second cross head die fed with coating thermoplastic resin compatible with the wetting thermoplastic resin.

BRIEF DESCRIPTION OF THE DRAWING

The single drawing is a diagram depicting the stages through which the fibers pass and at which they are contacted with wetting thermoplastic polymer and the second thermoplastic for reinforcing.

DESCRIPTION OF THE PREFERRED EMBODIMENT

Figure 1:
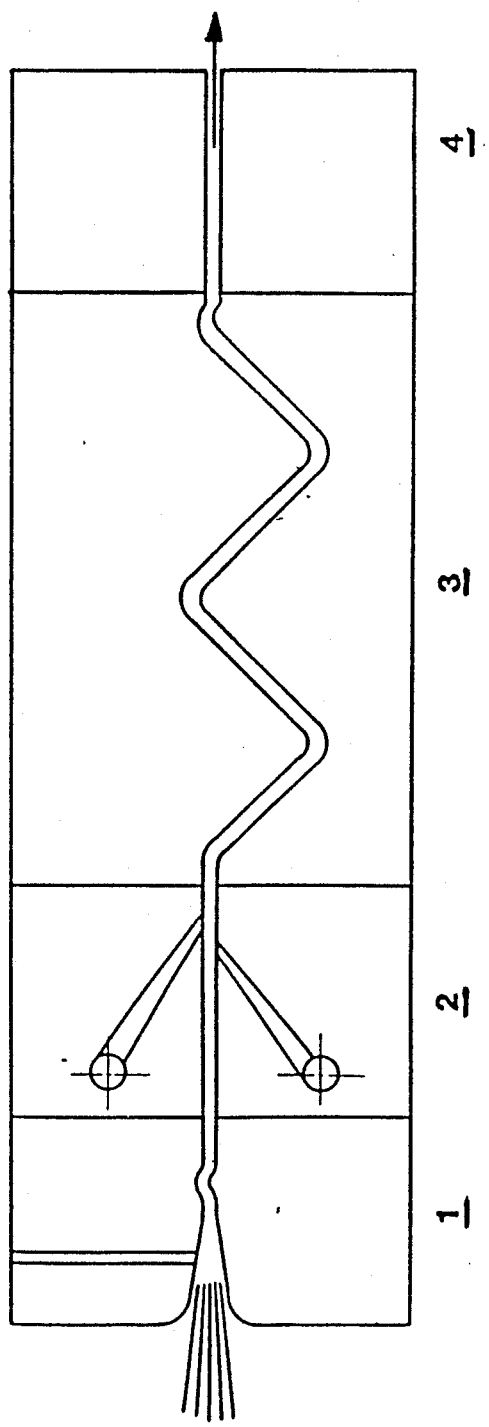

In a first stage, the rovings, prior to passing into the impregnation die, are expanded so as to spread out substantially side by side each one of the fibers of the roving. In this case, the rovings are in the form of a sheet or strip comprised of a succession of individual, continuous, parallel fibers. To carry out this alignment of the fibers by expanding the roving, the rovings are introduced into the die for impregnation, fed with molten wetting thermoplastic polymer after having passed through at least one baffle of a bar or baffle zone which applies a force perpendicular to the width of the rovings which causes spreading of the fibers. The sheet or strip thus formed is then impregnated with wetting thermoplastic resin and drawn, before the molding die, in a second system of bar zones formed by baffles substantially parallel with the first one or the first ones. In this system, the sheet or strip thus formed is then impregnated with wetting thermoplastic resin, passes into at least two baffles opposite and parallel to each other. In these conditions, the aggregate of fibers impregnated with wetting thermoplastic resin is, in the first bar zone, flattened on one of its faces forcing the resin to infiltrate in a molten state into the fibers for passing toward the opposite face. The opposite effect is produced when the aggregate of impregnated fibers comes into contact with the opposite baffle. This system of bar zones before and after contact with the wetting thermoplastic polymer allows the individual impregnation of the fibers with a minimum of polymer.

The impregnated fibers finally pass into a molding die that allows the making of strips or reeds.

The invention will be more readily understood by reference to the single drawing which diagrammatically shows the equipment of this first stage that comprises: 1 the bar or baffle zone for spreading the fibers or roving which can, prior to impregnation, include a vacuum means 2; the impregnation die connected to an extruder not shown, 3 the system of bars or baffles for insuring impregnation of the fibers and 4 the molding die.

At the exit end of the molding die, the fibers impregnated with the wetting thermoplastic resin are, in a second stage, coated with a thermoplastic resin for reinforcing. To do this, the continuous fibers impregnated with the wetting thermoplastic resin at a temperature preferably exceeding by approximately 40° C. the melting temperature of said wetting resin, pass into a classical die cross head die such as one used for coating wire or cable. The die is fed with the thermoplastic resin to be reinforced with fibers and is passed to a molding die after passing through a bar or baffle zone to insure thorough impregnation. At the exit of the molding die, the strips or reeds are granulated. These granules with long fibers that is, the length of the fibers correspond to that of the granules, are particularly adapted to injection, compression and transfer extrusion.

The continuous fibers impregnated with the wetting resin leave the molding die with the wetting resin in the molten state. The wetting resin impregnated fibers are preferably cooled by contact with the atmospheric air prior to entering the second die fed with coating resin. Prior to entering the coating die, the continuous fibers impregnated with wetting resin are in general at a temperature between about 40° and about 80° C.

The distance between the molding die of the fibers impregnated with wetting thermoplastic resin and the coating depends on the thermal characteristics of the resin used. This distance likewise depends on the speed at which the extruded material is drawn. This distance must preferably be as small as possible and in a practical manner is usually between about 0.5 and about 4 meters.

The weight ratio of wetting polymer to standard coating polymer depends on the proportion of fibers in the reinforced polymer. The materials finally obtained usually contain from about 20 to about 40 weight % of fibers. In these conditions, the continuous fibers impregnated only with the wetting resin usually comprise at least about 70 to about 75% by weight of fibers per 30 to 25% of wetting polymer. Finally, the materials obtained have weight compositions of about 20 to 40% fibers, 8 to 17% wetting polymer, and 72 to 43% coating polymer.

The continuous fibers that are employed to reinforce the thermoplastic resins are known and are either organic or mineral. By way of example, rovings of fiber glass, silica, carbon, or aramide can be introduced.

As explained, the wetting thermoplastic polymer must be compatible with the coating thermoplastic polymer. Although well known by those skilled in the art and of considerable practical importance, this compatibility is a characteristic whose scientific definition has never been given in an entirely satisfactory manner. Without going into the very controversial details of partial reciprocal miscibility of the polymers being considered, it is believed that two polymers are compatible if it is possible to mix them so as to obtain a material having a mechanical behavior approximate to or better than that of the weaker of the two. According to this definition and by way of example, the couples:

- grafted high-density polyethylene - low-density polyethylene,
- grafted high-density polyethylene - ethylene-vinyl acetate (EVA) copolymer
- grafted EVA - polyvinyl chloride,
- grafted polypropylene - polypropylene,
- sequenced poly(ether-amide) copolymer - polyamide
- functionalized polyamide (for example αω diamines, αω diacids, α amine ω acid, monoamine) - polyamide,
- modified EVA - EVA or low-density polyethylene (PEbd),
- grafted linear low-density polyethylene (PEbdl) - PEbdl or PEbd, and the like are compatible whereas a homopolymer of vinyl chloride and a homopolymer of styrene are incompatible.

By the term "wetting thermoplastic polymer" is understood a polymer that makes it possible to increase the bond between the surface fiber and coating polymer, thus playing the part of a coupling agent. The function of coupling agents are explained in Polymer Engineering Composite, M.O.W. Richardson - Appl. Sc. Publ. 1977, the best known being the organosilanes.

The wetting thermoplastic polymer is usually selected from among the low-viscosity polymers or also from among the polymers whose polarity is greater than the original corresponding polymers.

The low-viscosity polymer is preferably a polymer having a melting viscosity (Of +40° C.) at most equal to that of a polypropylene having a melt index 20 at 230° C. under 2.16 kg according to the standard ASTM D 1238 test.

The low-viscosity polymers include among others; polymers modified by peroxide degradation as for example, in the case of polypropylene, polyamide, polystyrene, or also the polymers resulting from the polyaddition of a polyamide oligomer functionalized with a co-reagent such as a polyepoxy or a polyisocyanate, or of a polypropylene oligomer functionalized with a co-reagent such as a diol polyether, the dihydroxylated polybutadiene, or an alpha, omega diamine polyamide. These low-viscosity polymers are likewise obtained from saturated polyesters such as polybutylene terephthalate (PBT) or polyethylene terephthalate (PET) whose chains are cut by controlled degradation so as to obtain a functional oligomer. This formation of functional oligomer is effected by mixing in the hot state, the saturated polyester in the presence of diamine and more particularly, dodecanediamine.

Among the polymers whose polarity is increased in relation to the original corresponding polymers, there are preferred those polymers having reactive polar sites. The polymers having polar sites are generally polymers modified either by grafting or by sequencing, for example, from maleic anhydride, acrylic acid, vinyl acetate in the case of polyethyelene, polypropylene, or copolymers, or also more generally, from compounds providing for example, polar sites of the type ketone, aldehyde, acid, ester, cyano, amine, and the like.

Polymers modified by grafting or sequencing that are particularly useful include: a grafted polypropylene such as polypropylene grafted with maleic anhydride or acrylic acid; a poly(ethylene-vinyl acetate) grafted with maleic anhydride; a grafted high-density polyethylene such as high-density polyethylene grafted with acrylic acid or maleic anhydride; a grafted linear low-density polyethylene such as linear low-density polyethylene grafted with acrylic acid or maleic anhydride; a poly(ether-amide) sequenced copolymer, and the like.

Some wetting polymers can be directly prepared by grafting or controlled degradation in situ in the stage of impregnation of the rovings. To do this, one can react polymer, degradation agent, and the grafting agent in the molten state in the extruder that feeds the impregnation. In the case of degradation by peroxides, there are preferably selected among the peroxides those that possess a half-life, at the reaction temperature, usually between about 180° and 250° C., less than or equal to the time the remains in the extruder. The proportions of grafting agent and/or degradation agent are generally between about 0.5 and about 3% by weight in relation to the weight of the basic polymer.

The examples that follow illustrate the invention without limiting it.

EXAMPLE 1

The preparation of polypropylene grafted with maleic anhydride was carried out with an extruder having two co-rotating screws of 30 mm diameter for feeding the impregnation die which is a crosshead die.

The formula for preparing this maleic anhydride grafted polypropylene binder was as follows:

| | |
|---|---|
| polypropylene 3050 MN4 | 100 parts |
| maleic anhydride | 0.85% |
| peroxide LUPEROX 101 (DHBP) | 0.7% |

| | |
|---|---|
| chlorobenzene | 0.2% |

The polypropylene was previously mixed with the powdered maleic anhydride and then incorporated at the level for feeding the extruder by a metering means.

The peroxide dissolved in the chlorobenzene was injected under pressure into the molten material by means of a dosing pump.

The temperature of the reaction was 180° C.

Removal of gas was carried out in line on the extruder with a vacuum of from about 10500 to about 13500 Pa.

The value of the melt index of the material at the die was 350 measured at 230° C. under 2.16 kg.

The analysis in GPC gives the following values:

| | | |
|---|---|---|
| $M_w = 8500$ | $M_n = 38000$ | $I = 2.2$ |

The concentration of maleic anhydride was 3500 ppm.

The wetting polymer was fed into equipment according to FIG. 1 including the following zones:

| Zone 1 - Roving Expanding Zone | |
|---|---|
| length | 60 mm |
| width | 100 mm |
| clearance | 3 mm |
| flared entrance and a baffle with a dome | 10 mm |
| Zone 2 - Wetting Polymer Impregnation Zone | |
| length | 90 mm |
| width | 100 mm |
| two feed ducts having a 10 mm diameter | |
| clearance at the exit of the zone | 3 mm |
| Zone 3 - Coating Polymer Impregnation Zone | |
| length | 200 mm |
| width | 100 mm |
| sinusoidal baffle zone with 3 baffle crests | |
| Zone 4 - Molding Zone | |
| die with 5 holes with a diameter of | 1.65 mm |
| length | 100 mm |
| width | 100 mm |

Five rovings of glass E 2400 tex. were passed into the impregnation die maintained at 210° C.

The polymer feed was 1.2 Kg/h.

Reeds with a weight portion of glass fiber of about 70% were drawn at the speed of 4.6 m/mn.

These reeds then passed into a coating die arranged 1 m from the wetting polymer coating zone.

The second die substantially in alignment with the first was maintained at a temperature of 210° C. It was mounted at a right angle to a single-screw extruder kept at a temperature of 200° C. and fed with polypropylene having a melt index 12 at 230° C. under 2.16 kg, at a rate of 10 kg/h.

From orifices of 4 mm diameter of the die, were drawn reeds of a weight portion of glass of about 20% which were then cooled and granulated to a length of 6 mm.

Three-point flexion tests (standard ISO 178) were carried out on test pieces 80×10×4 mm molded by injection.

| | |
|---|---|
| Flexion module | 2630 MPa |
| Stress with max. charge | 64.5 MPa |

The resistance to shock by falling mass (FWI) is measured on test pieces 100×100×2.8 mm in the following conditions:

| | |
|---|---|
| height of fall | 1 meter |
| diameter of the plunger | 12.7 mm |
| weight of the plunger | 5.14 kg |

The energy of rupture thus measured is 8.20 joules.

EXAMPLE 2 - comparison

Example 1 is repeated with the exception that reeds of 4 mm diameter were made directly in the first crosshead die provided with outlet orifices with a diameter of 4 mm. There was effected no coating by means of a polypropylene grade of MI 12.

There were obtained reeds with 20% weight % glass impregnated with only the wetting polymer cut up in pieces of 6 mm.

The mechanical properties of the product molded by injection were as follows:

| | | |
|---|---|---|
| Flexion module | 2050 | MPa |
| Stress at max. charge | 56.7 | MPa |
| Energy of rupture (shock FWI) | 7.6 | Joules |

EXAMPLE 3

The equipment of Example 1 was used with the exception that the die for the wetting polymer is fed from a single-screw extruder having a 30 mm diameter and a length equal to 22 diameters. In this equipment were produced reeds and granules of polyamide 12 reinforced with glass fibers.

With the crosshead die kept at 260° C., the rovings were coated with an oligomer of polyamide 12 mono $NH_2$ having a number average molecular weight of 5000. The reeds obtained at a weight proportion of glass of about 70% passed into a die kept at 280° C. and fed with polyamide 12 grade extrusion resin of high viscosity. The granules obtained have a weight proportion of glass of about 20%.

The mechanical portions of the product obtained were as follows:

| | | |
|---|---|---|
| flexion module | 3400 | MPa |
| stress at max. charge | 110 | MPa |
| breaking energy (shock FWI) | 8.75 | joules |

EXAMPLE 4

In the same equipment and under the conditions of Example 3 there were produced reeds and granules of PBT reinforced with fibers of glass.

The rovings are passed first into the wetting polymers die at 260° C. fed with a mixture of PBT and dodecanediamine at a rate of from 1 to 5% by weight. The reeds obtained with a weight proportion of glass of about 70% traverse the die fed with PBT of rigid grade at 270° C. The granules 6 mm long finally obtained had weight proportion of glass of about 20%.

The mechanical properties of the product obtained were as follows:

| | |
|---|---|
| flexion module | 5230 MPa |
| stress at max. charge | 140 MPa |
| breaking energy (shock FWI) | 6.6 joules |

What is claimed is:

1. A process for the production of thermoplastic resins reinforced with fibers, said process comprising:
   expanding rovings of said fibers by passing said rovings into a baffle zone;
   impregnating said rovings with a wetting thermoplastic polymer by means of a crosshead die to form impregnated rovings;
   after impregnation, passing said rovings through a second baffle zone; and
   coating the impregnated rovings in a coating zone comprising a second die with a thermoplastic coating polymer, for reinforcing, and thereafter, recovering the reinforced thermoplastic resins.

2. The process according to claim 1, wherein the impregnated rovings enter the coating zone at a temperature between about 40° to about 80° C.

3. The process according to claim 1, wherein the rovings are passed into a baffle zone where they form expanded rovings, the expanded rovings are impregnated by passing through an impregnation die fed, by means of an extruder, with wetting thermoplastic polymer, the impregnated rovings pass to a shaping die to form shaped rovings and the shaped rovings impregnated with wetting thermoplastic polymer, pass through a second die, substantially in alignment with the shaping die and fed by a second extruder with a thermoplastic polymer wherein the thermoplastic polymer is reinforced by the rovings.

4. The process according to claim 1, wherein the wetting thermoplastic polymer is directly prepared by controlled degradation of a polymer in a molten state in an extruder that feeds the impregnation die.

5. The process according to claim 4, wherein the controlled degradation is a peroxide degradation.

6. The process according to claim 4, wherein the wetting thermoplastic polymer is a saturated polyester degraded by a diamine to obtain a functional oligomer.

7. The process according to claim 1, wherein the wetting thermoplastic polymer is a product of a polyaddition of a polyamide oligomer functionalized with a co-reagent.

8. The process according to claim 1, wherein, in the impregnation step, the fibers are continuous and impregnated with a wetting thermoplastic polymer in a weight ratio of from about 70 to about 75% fibers per 30 to 25% wetting polymer.

9. The process according to claim 3, wherein after leaving the die fed with thermoplastic coating polymer, the final product has a composition of from about 20 to about 40% by weight fibers, from about 8 to about 17% by weight wetting polymer, and from about 72 to about 43% by weight thermoplastic polymer.

* * * * *